United States Patent [19]

Atwell et al.

[11] 3,967,858
[45] July 6, 1976

[54] CIGARETTE FILTER ROD TRANSFER APPARATUS

[75] Inventors: Charles Gary Atwell, Mechanicsville; Gilbert W. Tew, Richmond; Gerald A. Kraft, Richmond; Joseph A. Faries, Jr., Richmond, all of Va.

[73] Assignee: Philip Morris Incorporated, New York, N.Y.

[22] Filed: Nov. 27, 1974

[21] Appl. No.: 527,907

[52] U.S. Cl. .............................. 302/2 R; 302/42
[51] Int. Cl.² ........................................ B65G 51/02
[58] Field of Search .................. 302/2 R, 42, 49; 131/25; 214/302; 198/20 C

[56] References Cited
UNITED STATES PATENTS

| | | | |
|---|---|---|---|
| 3,222,110 | 12/1965 | Kelly et al. | 302/2 R |
| 3,336,085 | 8/1967 | Strydom | 302/2 R |
| 3,410,607 | 11/1968 | Tempel | 302/2 R |
| 3,411,827 | 11/1968 | Rupert | 302/2 R |
| 3,608,972 | 9/1971 | Rudszinat | 302/2 R |
| 3,614,166 | 10/1971 | Spitz | 302/2 R |

*Primary Examiner*—Evon C. Blunk
*Assistant Examiner*—Jeffrey V. Nase
*Attorney, Agent, or Firm*—Watson Leavenworth Kelton & Taggart

[57] ABSTRACT

A pneumatic conduit cigarette rod transfer system includes an extended capacity rod hopper, a hopper rod level detector and a control arrangement responsive to such detector to pressurize the conduit and supply thereto rods for transmission to the rod hopper in selective time spaced relation compatible with rod hopper capacity. To facilitate entry of transferred rods into the hopper, a conveyor is disposed interiorly of the hopper in rod receiving relation to a further conveyor disposed exteriorly of the hopper.

18 Claims, 7 Drawing Figures

3,967,858

CIGARETTE FILTER ROD TRANSFER APPARATUS

FIELD OF THE INVENTION

This invention relates generally to article handling and more particularly to apparatus and systems for transporting filter rods from a remote location to filter cigarette-making machinery.

BACKGROUND OF THE INVENTION

As contrasted with the automated making of non-filter cigarettes, filter cigarette manufacture presents a more demanding operation in its continuing requirement for supply of filter rods to the ultimate cigarette maker or assembler. Typically, the supplied rods are elongate solid cylinders of fibrous material cuttable longitudinally to form a plurality of filter plugs, each for use in the making of an individual cigarette. Whereas hand or manual feeding of rods to the maker directly at the making location has long been practiced, for example, by placing trays of rods atop a rod hopper on the maker, more recent efforts have sought to feed rods to the rod hopper in automated manner from a location remote from the maker, apparatus for use in such systems being disclosed in U.S. Pat. Nos. 3,608,972 and 3,222,110 and British Pat. No. 1,070,339 and entire systems being commercially known, for example, the machinery identified as "APHIS (Automated Plug Handling Inspection System) II", produced by the Molins Machine Co., Ltd. and described in its publication for such machinery, entitled "Illustrated Parts List".

In applying pneumatic rod transfer to filter cigarette making, systems and apparatus known prior to the present invention are considered not to accommodate the process to a commercially desirable extent. In a first instance, such prior art arrangements are not considered to service the maker with a sufficient reserve capacity of rods to permit continued operator-unassisted maker activity during typical "down" periods of the pneumatic rod transfer apparatus, i.e., periods during which malfunction therein interrupts automated maker rod hopper feeding for several minutes. In a second instance, these prior art arrangements are considered not to provide for delivery of rods to the maker rod hopper sufficiently quickly upon the occurrence of a demand for filling thereof.

SUMMARY OF THE INVENTION

The present invention has as its primary object the provision of improved apparatus and systems for automated transporting of filter rods to a filter cigarette maker.

A more particular object of the invention is to provide apparatus and systems for automated pneumatic transfer of filter rods to a filter cigarette maker in such manner as to maintain an increased rod reserve at the maker and to provide for the supply of rods to the maker hopper upon demand at an improved rate than heretofore attained.

These and other objects of the invention are attained by the combination, in a pneumatic conduit type transfer system, of an expanded capacity maker rod hopper and rod level control means therefor and a pneumatic control arrangement responsive to demand signals generated by such rod level control means to fill the rod hopper and maintain a quantity of rods in the conduit for satisfaction of further demands, compatible with anti-jam requirements, such expanded maker rod hopper capacity and quality control of manufactured cigarettes.

The foregoing and other objects and features of the invention will be understood from a consideration of the following detailed description of preferred embodiments of apparatus and systems in accordance with the invention and from the drawings wherein like reference numerals identify like parts throughout.

DESCRIPTION OF THE PREFERRED EMBODIMENTS

Figure 1:
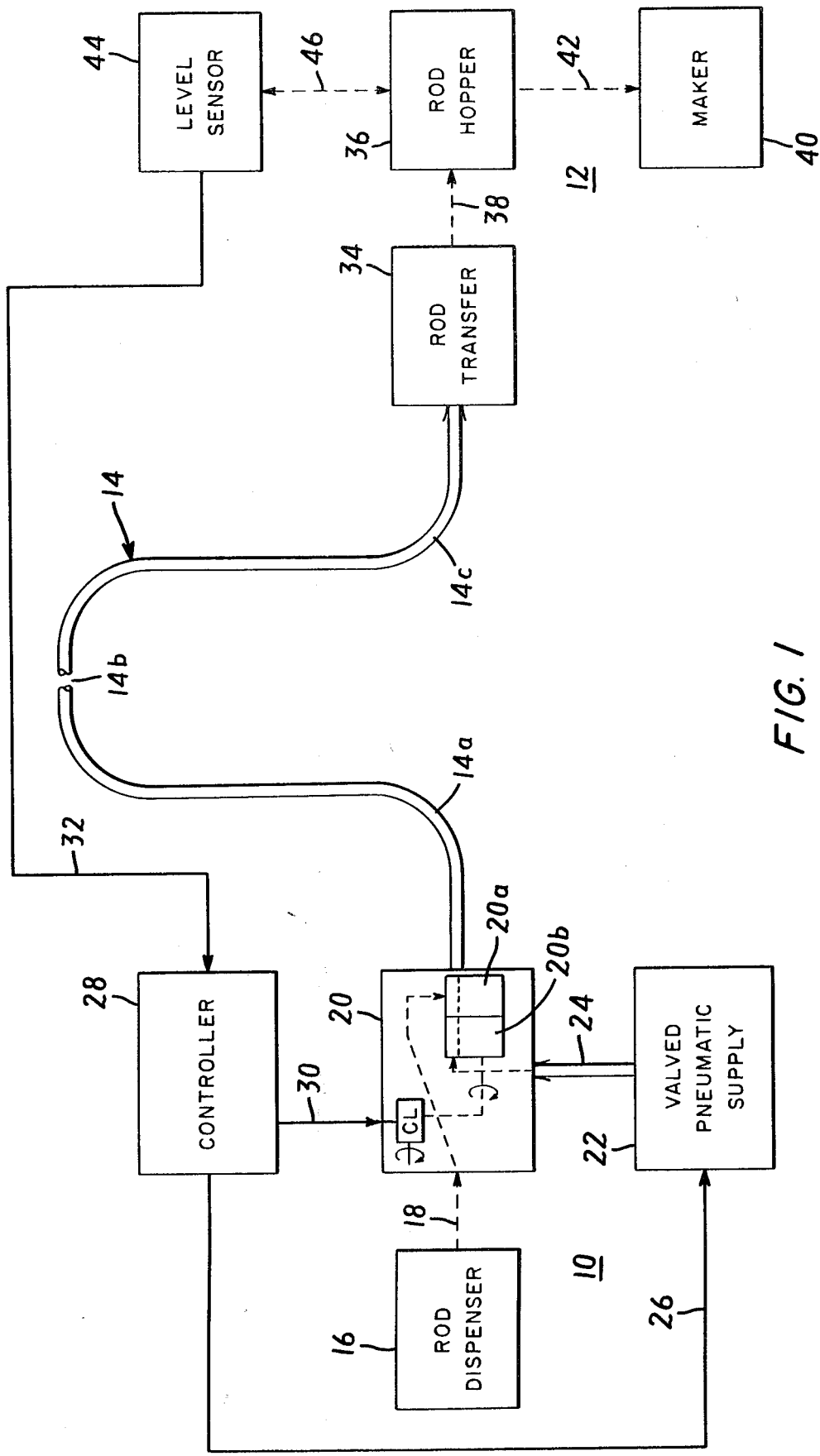
FIG. 1 is a functional block diagram of the system of the invention.

Referring to FIG. 1, the system therein illustrated for automated pneumatic transfer and handling of cigarette rods comprises a transmitter 10 and a receiver 12 remotely located relative to one another. Typically, the transmitter is situated at a rod storage or like location which may be several hundreds of feet away from the receiver, the latter being at the site at which rods are cut into individual plugs which are then integrated with paper and tobacco for the making of filter cigarettes. Conduit 14, desirably in the form of cylindrical tubing of diameter slightly larger than the cigarette rod diameter, extends from the transmitter to the receiver and includes an upwardly extending section 14a, an extended length substantially horizontal section 14b and a downwardly extending section 14c. With this configuration for conduit 14, sections 14a and 14c may extend rapidly upwardly over relatively short horizontal distances to section 14b, which may be ceiling-mounted whereby use of the conduit may be enjoyed without disturbing normal floor operations in the facility.

In the interests of brevity, extended incorporating reference is made to the previously known automated cigarette rod handling system identified above as "APHIS II" and to the complete pictorial disclosure of the components thereof set forth in the above-referenced Molins publication.

Transmitter 10 includes a rod dispenser 16, such as is in the APHIS II system, adapted to sequentially supply at its outlet 18 individual rods for use in rod distributor 20. While not shown in detail in the accompanying drawings, dispenser 16 thus may comprise a hopper having an agitator situated therein and continuously energized to distribute rods to a vertical channel having an inlet of width slightly larger than the diameter of the rods and length slightly larger than the rod length, whereby the rods are transported downwardly essentially horizontally to outlet 18. Distributor 20 includes a unitary assembly adapted for rotation about a horizontal axis and having a first elongate cylindrical member 20a defining longitudinally extending open peripheral slots of semi-circular cross-section and movable successively into registration with and below the outlet of the vertical channel. Juxtaposed axially with such cylindrical member for corotation therewith is a second elongate assembly 20b of discrete peripheral cylindrical members defining cylindrical passages therethrough aligned with the first cylindrical member slots. Clutch CL provides selective rotational input to members 20a and 20b as discussed below.

In practice under the present invention, distributor 20 is served with pressurized air by valved pneumatic supply 22 over line 24. Such pressurized air is applied sequentially to the second cylindrical member passages in the course of rotation thereof to direct rods supported in the first cylindrical member peripheral slots seriatim into conduit section 14a.

While the structure of dispenser 16 and distributor 20 may be as found in the aforesaid APHIS II system, that system employs an unvalved pneumatic supply continuously supplying pressurized air to distributor 20. In contrast, systems according with the present invention include, in association with their pneumatic supply, a valve member which is selectively opened on energization of line 26.

Transmitter section 10 includes a controller 28 for purposes of such selective energization of line 26 and also for energization of line 30 which provides selective energization of a clutch to rotate the aforesaid unitary assembly of distributor 20. Controller 28 is itself responsive, in energizing lines 26 and 30, to the state, e.g., grounded or open circuited, of line 32 derived from receiver 12.

Turning now to receiver 12, rod transfer unit 34 receives rods seriatim from conduit section 14c and transfers the same individually to its outlet 38 and then into rod hopper 36. A suitable form of transfer unit 34 is embodied in the aforesaid APHIS II system and includes apparatus for receiving rods and individually transferring them upon the surface of a horizontally disposed toothed chain belt conveyor which exits into hopper 36.

As alluded to above, prior to development of systems such as the APHIS II system, maker rod hoppers were of the type manually fed at all times, i.e., by insertion of a tray of rods atop the hopper and withdrawal of a removable bottom plate from the tray to empty its contents into the hopper. On integration thereof with existing maker equipment, the APHIS II system dispensed with the rod tray and introduced into the theretofore manually fed rod hopper a control arm pivotally supported by the hopper atop rods introduced into the hopper by transfer unit 34 and a sensor device (photocell and detector) generating a rod demand output signal on the occurrence of preselected low rod capacity in the hopper. Since the manually-fed rod hopper thus integrated in the APHIS II system is of limited capacity, upon malfunction in the pneumatic rod transfer arrangement, it is often found that an insufficient supply of rods is available for maintaining rod supply to cigarette maker 40 through hopper outlet 42. Accordingly, hand-feeding of rods to the rod hopper is frequently required in order to insure that maker 40 is maintained in operation during pneumatic system malfunctions.

As is discussed in detail below, hopper 36 of the invention has expanded capacity and provides for a reserve capacity of rods sufficient to maintain maker 40 in operation during typical down periods of the pneumatic system and also facilitates the ready additional supply of a large volume of rods manually.

Level sensor 44 is associated with hopper 36 as indicated by line 46 therebetween to sense the level of rods in the hopper and to change the state of line 32 when a preselected low rod level condition exists in the hopper.

Figure 2:
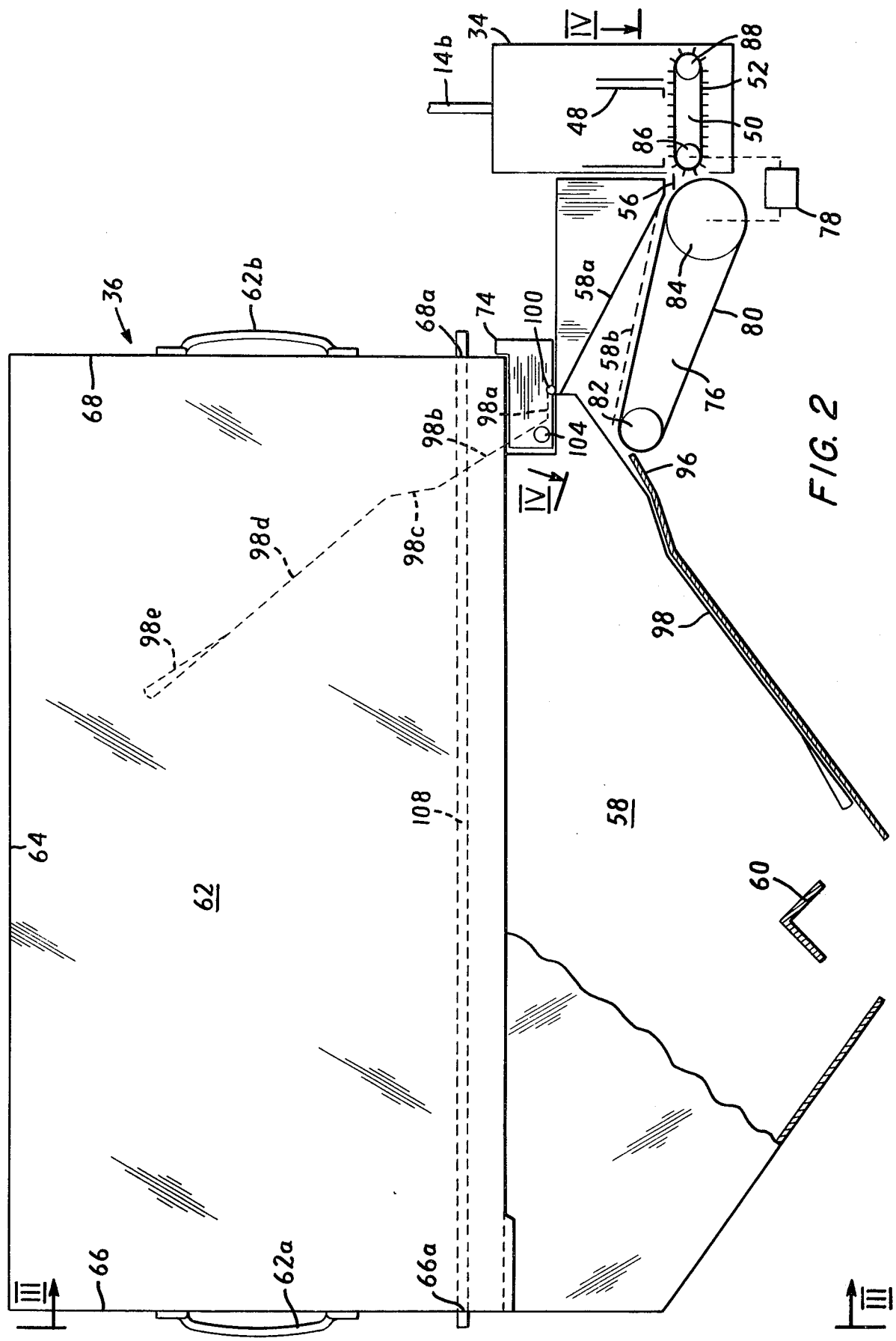
FIG. 2 is a front elevational view of maker rod hopper apparatus in accordance with the invention.

Turning now to FIG. 2, vertical channel 48 of transfer unit 34 issues rods individually onto horizontally disposed chain belt conveyor 50 whereby rods are positively issued at outlet 54 by engagement with belt teeth 52. Plate 56 supports movement of rods issuing at outlet 54 into hopper 36.

Hopper 36 includes a lower fixed hopper section 58, opposed downwardly sloping sidewalls of which lead to apparatus of maker 40 adapted for cutting rods into filter plugs. To this extent, this hopper section is that commonly used in manually-fed machinery, such as of the well-known PA-8 variety. As in the case of PA-8 machines, hopper section 58 includes an agitator 60 rotatively reciprocated by shaft 60a (FIG. 3) and serving to circulate rods downwardly into the maker.

Figure 3:
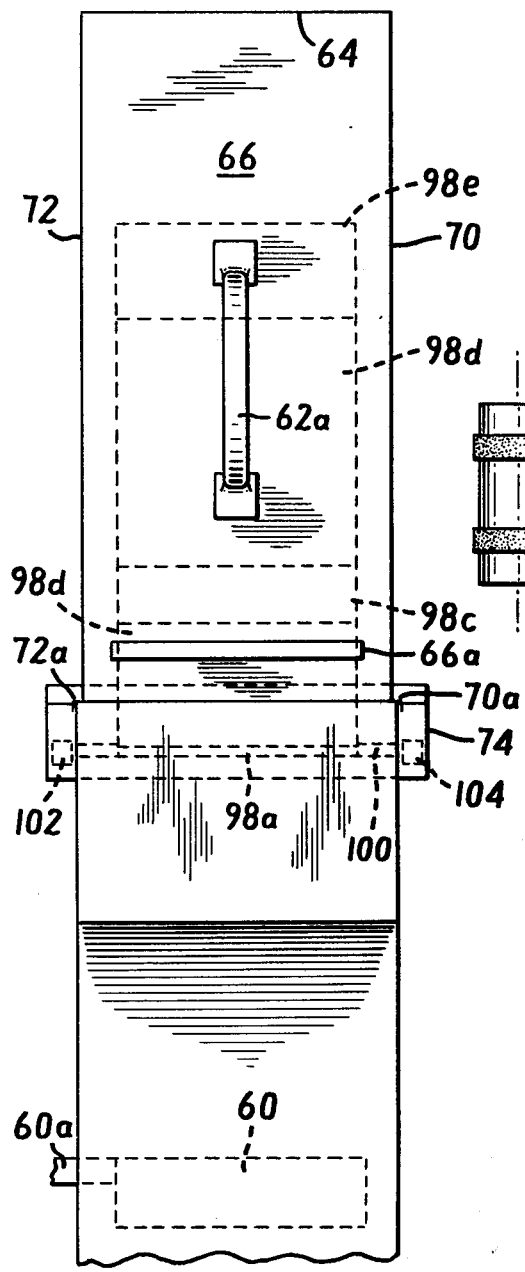
FIG. 3 is a side elevational view of the FIG. 2 apparatus as seen from plane III—III of FIG. 2.

In accordance with the invention, hopper 36 also includes a removable upper section 62 comprising a box-like member having a solid upper wall 64, opposed sidewalls 66 and 68, incorporating respective slots 66a, 68a, for purposes below discussed, a forward wall 70 (FIG. 3) and an opposed rear wall 72. The width of hopper section 62 between walls 70 and 72 is, as in the case for counterpart walls of fixed hopper section 58, slightly larger than the length of the rods. To facilitate support of hopper section 62 atop hopper section 58, walls 70 and 72 define respective ledges 70a, 72a, as shown in FIG. 3. In addition, sidewall 68 is directly seated upon casing 74 in turn supported on fixed hopper section 58.

Referring again for the moment to the APHIS II system, rods are directly forced therein into its integrated PA-8 hopper by chain belt conveyor 50. Within the limits of the capacity of such hopper, akin to that of hopper section 58 of FIG. 3, conveyor 50 is effective to fill the hopper without damage to rods occasioned by forces imposed on rods issuing from conveyor 50 by hopper-contained rods. However, efforts at expanding the capacity of such PA-8 hopper as by the addition thereto of apparatus similar to removable hopper section 62 are found to impose damaging forces on rods as they issue from conveyor 50.

In providing for expanded hopper capacity and at the same time insuring against rod damage, the system of the present invention introduces various modifications to such PA-8 hopper arrangement. In a first instance, the invention provides removable hopper section 62 in form compatible with customary manual-feeding arrangements (trays) heretofore widely used in cigarette making and providing extended hopper capacity. In a second instance, the invention introduces, in association with the fixed hopper section, means forceably moving cigarette rods from conveyor 50 to a further issue position interiorly of the hopper. In still a further instance, the invention modifies the control arm of the APHIS II system so as to insure circulation of all rods contained in such extended capacity hopper to the maker.

Figure 4:
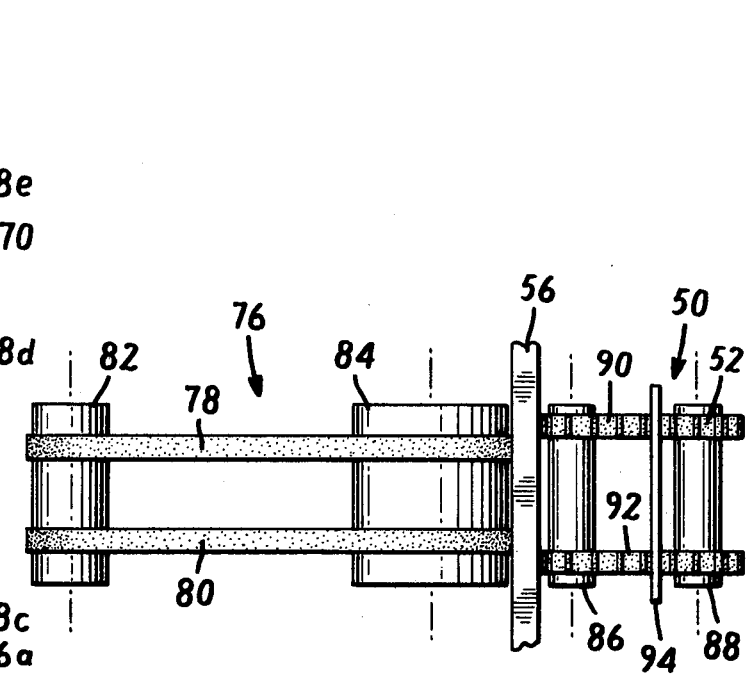
FIG. 4 is a plan view of the successive rod conveyor arrangement of the FIG. 2 apparatus as seen from plane IV—IV of FIG. 2.

For these purposes, the FIG. 2 apparatus includes a timing belt or like conveyor 76 driven through gearing 78 by drive means of conveyor 50. Conveyor 76, as best seen in FIG. 4, includes spaced endless bands 78 and 80 extending from plate 56 and encircling rollers 82 and 84. Rollers 82 and 84 are vertically displaced from one another (FIG. 2) as contrasted with common vertical disposition for rollers 86 and 88 of conveyor 50 such that belts 78 and 80 are inclined upwardly from horizontally disposed belts 90 and 92 of conveyor 50. As in the case of belts 90 and 92, belts 78 and 80 may be spaced transversely to an extent less than the length of cigarette rod 94. Hopper section 58 includes an inclined entry sidewall 58a and suports a flexible strip drag member 58b of nylon or vinyl to facilitate properly oriented transport of first conveyed rods.

The rightward sloping wall of hopper section 58 includes a lip portion 96 juxtaposed with roller 82 to receive rods issuing from conveyor 76. Hopper control arm 98 is supported for pivotal movement by shaft 100 and, at start-up of the system, i.e., with hopper 36 empty, arm 98 is in facing relation to conveyor 76. The control arm is configured with a first portion 98a extending from shaft 100, and second, third and fourth portions 98b, 98c and 98d angularly inclined to one another and portion 98a and a folded end portion 98e. As appears in the solid line showing for control arm 98 in FIG. 2, the rightward sloping wall of hopper section 58 is desirably formed with sections configurated complementary to control arm sections 98c and 98d, the control arm length being such that it may move into and out of this solid line position without engaging agitator 60.

With start-up conditions at hand, light source 102 (FIG. 5) of level sensor 44 directs its output onto detector 104, there being no intervening rods to intercept and block light transmission in the sensor. The sensor 44 accordingly applies ground potential to line 32 (FIG. 1) indicative of a rod hopper demand condition to which the system of the invention is operatively responsive to supply rods to belt 76 whence they are directed into hopper section 58 and elevate control arm 98 as the hopper section becomes filled. Supply of rods continues until hopper section 58 is entirely filled and hopper section 62 is filled to an extent displacing control arm 98 into its broken line position. At this time, hopper-contained rods interrupt passage of light between light source 102 and detector 104 and level sensor 44 is operative to open-circuit line 32, whereupon the system discontinues supply of further rods to conveyor 76.

Once the foregoing completion of start-up conditions is attained, system operation is thereafter periodic, responsive to consumption of hopper-contained rods by the maker to generate demand signals and satisfy the same. The illustrated configuration of control arm 98 is found suited for insuring circulation of all rods in the hopper to the maker. Thus, control arm 98 is of substantially greater mass and length than the APHIS II control arm and thereby applies sufficient force to rods in all directions therefrom to provide for their downward movement. Also, section 98e of the control arm is found helpful to minimize the number of hopper-contained rods which spill over the top of the control arm into the rightward unused portion of the hopper section 62. With the cooperative provision of positive displacement of rods away from toothed conveyor 50, such increased mass control arm is found to be usable without accompanying deformation of rods.

Figure 5:
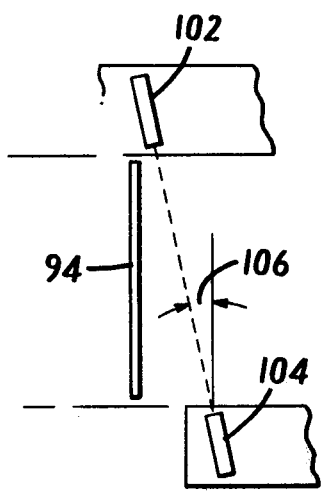
FIG. 5 is a schematic illustration of the desired orientation of components of the rod level sensor of FIG. 1.

Two measures are introduced in order to lessen chatter in system operation, i.e., short term transmitter turn-on and turn-off attributable to oscillation in level sensor 44 control of line 32. In a first measure, as is shown in FIG. 5, source 102 and detector 104 of level sensor 44 are skewed into an alignment which is slightly non-parallel with the disposition of rods contained in the hopper. Thus, angle 106 may be several degrees. This measure avoids the possibility of generating a demand signal where the level sensor source and detector communicate with one another through a passage existing between adjacent rods as contrasted with the desired communication therebetween atop the vertically-uppermost contained rods. The second measure involves modification of preexisting level sensor circuitry, as in the APHIS II and PA-8 combination, discussed in detail below in connection with FIG. 7.

Figure 6:
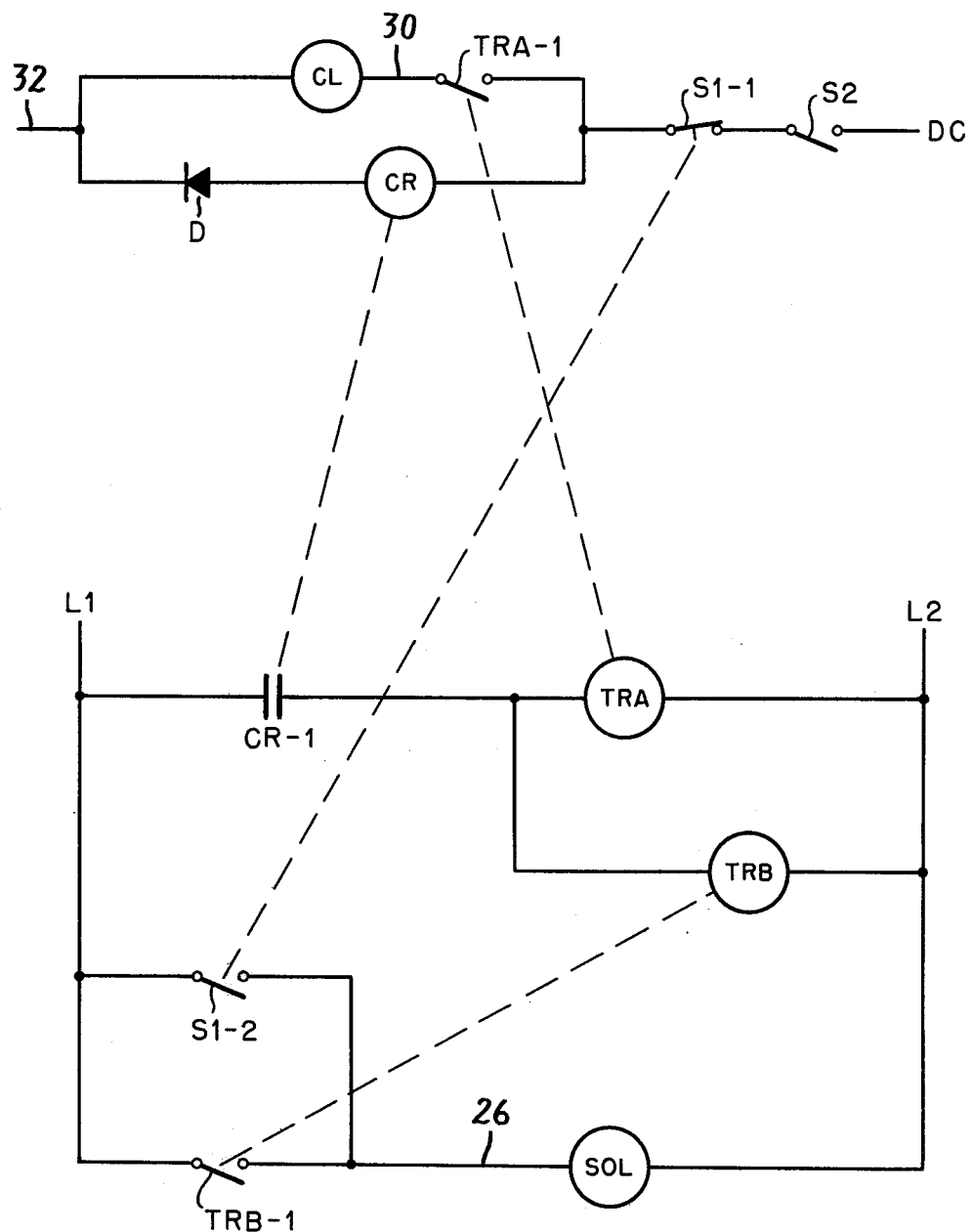
FIG. 6 shows a preferred circuit arrangement of the FIG. 1 controller.

Referring now to FIG. 6, the components of controller 28, the valve member of supply 22 and the clutch of distributor 20 are preferably arranged in a first section connected between line 32 and a suitable DC voltage level and a second section connected across fused power mains L1 and L2. When line 32 is connected to ground potential, as occurs when level sensor 44 senses a rod demand condition in hopper 36, relay CR is energized if switches S1-1 and S2 are closed. With relay CR energized, it contacts CR-1 are closed whereupon time delay relay TRA is connected across L1-L2. Relay TRA is constructed such that a preselected period of time need expire after the relay is connected across L1-L2 before it closes contacts TRA-1 thereof. A preferred relay for this purpose is Potter & Bromfield relay No. CDB-38-70003, having an adjustable time delay of 1 to 10 seconds. Closure of contacts CR-1 also connects time delay relay TRB across L1-L2. This relay closes its contacts TRB-1 immediately upon such connection thereof across lines L1-L2. Accordingly, solenoid SOL of the valve member of supply 22 is connected across lines L1-L2 directly upon energization of relay CR and the pneumatic supply valve supplies pressurized air through distributor 20 to conduit 14.

Following expiration of the time delay of relay TRA, its contacts TRA-1 close, thereby energizing clutch CL of distributor 20. The unitary assembly of distributor 20 is rotated supplying rods successively to conduit 14. The time delay of relay TRA is selected to permit pressurization of conduit 14 sufficient to force rods throughout the entire extent thereof and insures that rods will not be supplied to conduit 14 during initial low pressurization thereof, thus avoiding blockage and like malfunctions in the conduit.

Upon interruption of connection of line 32 to ground potential, i.e., upon satisfaction of a demand for plugs in the receiver, relay CR is deenergized whereupon its contacts CR-1 open, immediately deenergizing relay TRA which opens its contacts TRA-1, thus discontinuing supply of rods to conduit 14 by distributor 20. On the other hand, relay TRB is constructed such that its contacts TRB-1 remain closed for a predetermined time period after energizing voltage is removed from the relay. Pressurization of conduit 14 by supply 22 accordingly continues for a period of time following the discontinuance of rod supply thereto by distributor 20. This maintenance of pressurization in conduit 14 insures that rods delivered thereto prior to satisfaction of the receiver demand and resident in conduit 14 are forced into a quiescent position in conduit section 14b, i.e., a position from which essentially no rods are returned to the transmitter due to conduit pressure differential or gravity.

Relay TRB is preferably Regent relay No. TM2001, having an adjustable time delay of one-tenth to 5 seconds. The valve member of supply 22 is preferably Valcor valve No. 88C89C95-441.

Switch S1-1 is coupled to switch S1-2 and is oppositely-poled therefrom. By this arrangement, solenoid SOL may be energized for conduit clearing purposes while, at the same time, clutch CL is maintained unenergized.

As will now be discussed, the foregoing circuit arrangement for controller 28 provides for the delivery of rods to the maker rod hopper with characteristic improvements over rod delivery otherwise attained.

Upon satisfaction of a hopper demand, in the present or prior art systems, the rod conduit contains rods throughout its length and further insertion of rods into the conduit it discontinued. Three situations then arise. In a first situation, wherein pressurized air might be continually supplied to the conduit, as in the APHIS II system, all conduit-contained rods are transferred to the hopper, leaving no rods in the conduit. In a second situation, supply of pressurized air to the conduit might be discontinued simultaneously with satisfaction of a hopper demand.

In such second situation, conduit-contained rods would in first part reach the maker rod hopper by gravity and pressure differential effects and would in second part be returned to the distributor by like effects. In remaining third part, conduit-contained rods would be quiescently situated in horizontally-disposed conduit section 14b. No difficulty would arise as respects the third part rods. However, the first part rods, disposed in section 14a, would give rise to interference on subsequent demand for rods, possibly giving rise to rod jam at the distributor outlet or in conduit section 14a. At the very least, such first part rods would give rise to delay in movement of rods upstream thereof to the maker hopper on the occurrence of the next demand condition, i.e., adequate pressurization of conduit 14 to displace the latter rods would necessarily be delayed. While no jamming or conduit pressurization delay arises in the first situation above, this situation is undesirable insofar as no rods are contained in the conduit and the first rods reaching the maker hopper on subsequent demand conditions need traverse the entire length of the conduit. Accordingly, the first situation will be recognized as providing relatively low rate in rod supply when measured against a time base commencing at the occurrence of the demand condition.

Such first and second situations and the undesired consequences thereof are avoided in accordance with the present invention by constraining activity to a third situation imposed by controller 28. As discussed in connection with FIG. 6, relay TRB continues the supply of pressurized air to conduit 14 for a preselected time period subsequent to satisfaction of a demand condition, i.e., after distributor 20 operation is discontinued. This preselected time period is adjusted in accordance with conduit length, inclination and configuration to maintain a supply of rods in horizontally-disposed conduit section 14b in position such that no rods are returned to conduit section 14a. Accordingly, upon the occurrence of the next demand signal, the rods situated in conduit section 14b are delivered forthwith to the rod hopper with additional rods immediately following the same as supplied to the conduit by distributor 20. This arrangement will be seen to avoid the operational difficulties in the first situation above discussed and to increase rod transfer rate over and above that occurring in the second situation. As will be further appreciated, the benefits provided by such activity of controller 28 are realizable only where rod hopper 36 has sufficient capacity, also attained in the invention, to accept increased rod quantities. Thus, the transfer benefits are not realizable by combination of the system of the invention with limited capacity prior art hoppers, such as the PA-8 hopper considered above.

In manual feeding of rods to the maker hopper during periods of pneumatic transfer malfunction, the control arm in the PA-8 hopper integrated with the APHIS II system is found not to permit the manual addition of rods other than those which can be contained within the limits of the PA-8 hopper. In contrast, the present invention affords expanded manual feed capacity to the rod maker hopper. Assuming malfunction in the pneumatic transfer system of the invention, the expanded capacity hopper 36 permits a greater pneumatic transfer down period with insured rod supply to the maker by virtue of its aforesaid construction. Thus, where a prolonged down period occurs and the expanded reserve of rods is depleted, upper section 62 of hopper 36 may be removed by upward movement of handles 62a and 62b. A replacement section 62 may be maintained at the maker inverted from the disposition shown in FIG. 2, i.e., with the hopper section supported on its wall 64 and filled with rods. Removable panel 108 (FIG. 2) is situated atop the rods and extends through wall openings 66a and 68a. Panel 108 is of width substantially coextensive with slots 66a and 68a whereby the replacement hopper section may be inverted and positioned as shown in FIG. 2 without loss of the rods. Panel 108 is then withdrawn from the inverted casing and the rods contained therein emptied into hopper section 58 atop control arm 98, which is then in a position between the solid and broken line configurations thereof in FIG. 2. Forward wall 70 of hopper section 62 is removably mounted with respect to the remainder of the hopper section and is now removed to permit an operator to lift control arm 98 into its broken line configuration in FIG. 2 and then simply place rods which may have moved rightwardly of the control arm into the leftward portion of hopper section 62. As will be appreciated, upon the resumption of pneumatic rod transfer, such replaced casing serves as a continuing portion of hopper 36.

In the event of a quite prolonged down period of pneumatic transfer arrangement, substitution of further replacement hopper sections may be made, in which case the arrangement of the invention has particular benefit in returning machine operation directly to the customary manual rod feed arrangements long practiced by plant personnel.

Figure 7:
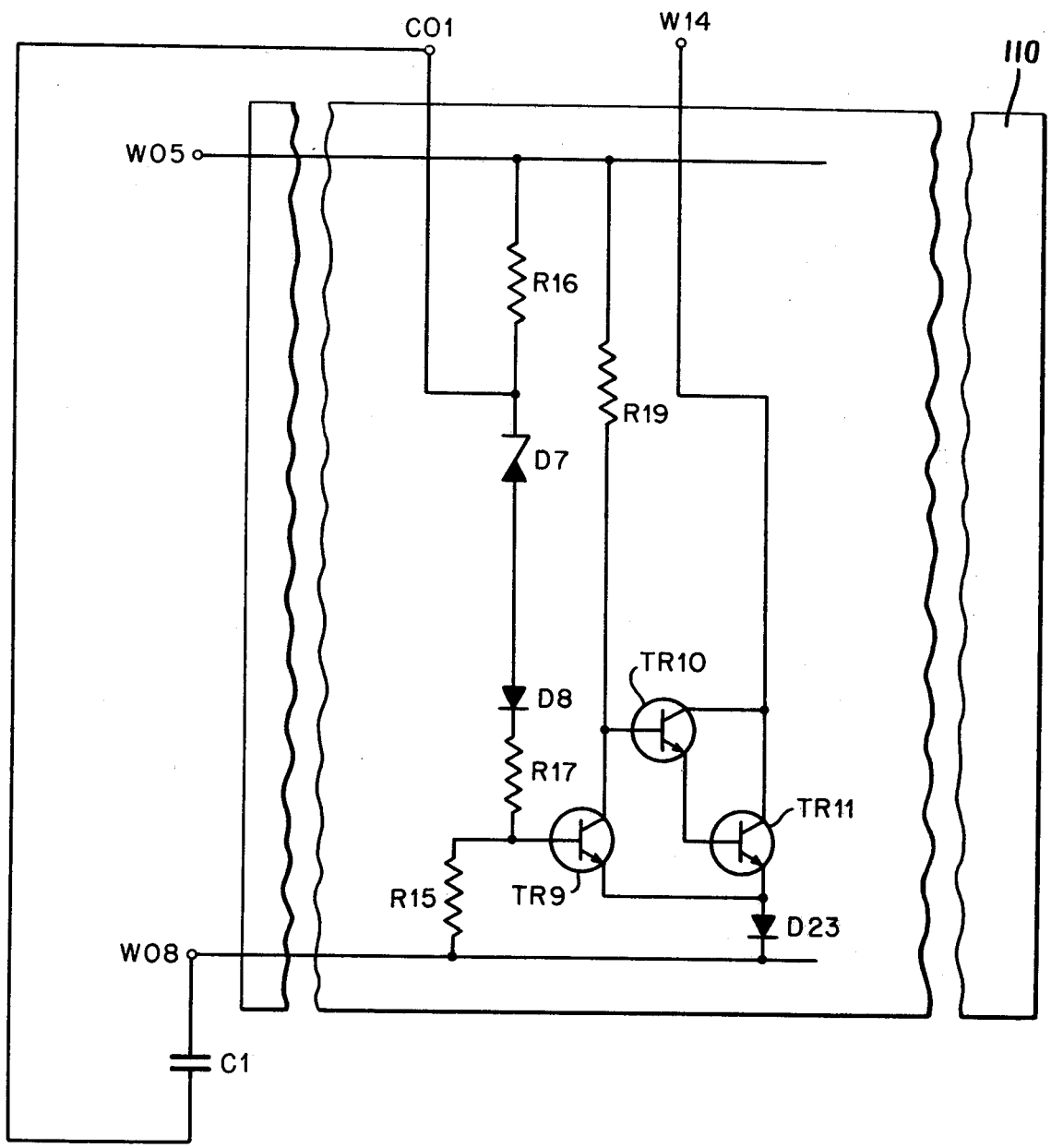
FIG. 7 is a circuit diagram illustrating a particular circuit arrangement for the detector portion of the rod level sensor of FIG. 1.

Turning now to FIG. 7, the second of the above-discussed measures to avoid transmitter chatter involves a modification of detector circuitry hertofore known in hopper level sensors. FIG. 7 depicts in card 110 thereof a part of the circuitry shown in a circuit drawing WD2700-085, "APHIS II Control Card" contained in the above-mentioned publication of the Molins Machine Co., Ltd. The illustrated card 110 circuit has four output terminals, WO5, to which is applied a positive DC voltage, WO8, which is connected to ground potential, CO1, which is connected to one terminal of the hopper photocell (detector 104), the other hopper photocell terminal being connected to ground potential and W14, which is connected to line 32 (FIGS. 1 and 6). As the photocell is illuminated by light source 102, terminal CO1 is lessened in positive potential whereby transistor TR9 decreases in conduction giving rise to increased conduction in transistor TR10 and a switching of transistor TR11 to a highly conductive state. Terminal W14 is thereby connected to ground potential through transistor TR11 and diode D23 and transmitter operation is initiated as discussed above in connection with the circuit of FIG. 6. Conversely, when communication between light source 102 and detector 104 is interrupted, terminal CO1 is rendered more positive, increasing conduction in transistor TR9 and thereby decreasing conduction in transistor TR10 such that transistor TR11 is rendered non-conductive and terminal W14 is thereby open-circuited. As also above discussed, open-circuiting of terminal W14 (line 32) indicates a demand satisfied condition and the transmiter operation is discontinued.

In accordance with the invention, capacitor C1 is connected across terminals CO1 and WO8 of card 110, i.e., in parallel with the photocell of detector 104, such that the circuit of FIG. 7 is rendered unresponsive to rapid change in voltage at terminal CO1. By this provision, pulse-type excursions in terminal CO1 voltage, occasioned by intermittent communication between light source 102 and detector 104 may occur without initiating transmitter operation.

Suitable circuit values for components other than capacitor C1 are set forth in the aforesaid Molins control card drawing as follows: transistors TR9, TR10 and TR11 are all transistors type-BFY 50; diode D8 is a diode type-15923; diode D7 is a diode type-BZY 88C12; resistor R15 is 47 K-ohm, R16 is 4.7 K-ohm, R17 is 22 K-ohm and R19 is 3.3 K-ohm; diode D23 is a diode type-10D4. With these parameters, capacitor C1 is 100 uf.

Various changes and modifications now made evident to those skilled in the art may readily be introduced in the foregoing embodiments of the invention without departing from the scope thereof. While the first hopper conveyor inclination relative to the conveyor of the rod receiver or transfer unit is desirably from 13 to 17°, and preferably 15° in the arrangement of FIG. 2, such inclination may be varied as other parameters of the system vary. Thus, the apparatus and systems specifically illustrated in the drawings are intended in a descriptive and not in a limiting sense. The true spirit and scope of the invention is defined in the following claims.

What is claimed is:

1. A system for transporting cigarette rods from a first rod supply location to a second cigarette maker location, comprising:
   a. conduit means extending from said first location to said second location;
   b. pneumatic source means having an outlet and energizable to supply pressurized air to said outlet;
   c. rod supply means at said first location defining a passage between said pneumatic source means outlet and said conduit means and energizable to supply individual rods to said passage;
   d. rod receiver means at said second location for receiving rods conveyed through said conduit and having an outlet, said rod receiver means including first conveyor means issuing rods sequentially therefrom at said outlet;
   e. rod hopper means at said second location for containing said rods issuing sequentially from said rod receiver means outlet and generating a first output signal upon containment of rods in quantity less than a preselected rod quantity and generating a second output signal upon containment of rods in quantity equal to said preselected rod quantity, said rod hopper means including second conveyor means in series conveying disposition relative to said first conveyor means, said second conveyor means issuing rods therefrom interiorly of said rod hopper means; and
   f. control means responsive to said rod hopper means first output signal to energize said pneumatic source means and to energize said rod supply means upon expiration of a first predetermined time period after such energization of said pneumatic source means and responsive to said second output signal to deenergize said rod supply means and to deenergize said pneumatic source means upon expiration of a second predetermined time period after such deenergization of said rod supply means.

2. The system claimed in claim 1 wherein said rod supply means includes rod distributor means rotatable to successively supply individual rods to said passage and clutch means energizable to rotate said distributor means.

3. The system claimed in claim 2 wherein said pneumatic source means includes a supply of pressurized air and valve means disposed between said supply and said pneumatic source means outlet, said valve means having a solenoid energizable to render said valve means conductive to said pressurized air.

4. The system claimed in claim 3 wherein said control means includes first and second time delay relays for respectively energizing said solenoid and said clutch.

5. The system claimed in claim 4 wherein said first time delay relay includes contacts which are closed upon relay energization and opened at a time after relay deenergization and wherein said second time delay relay includes contacts which are closed at a time after relay energization and thereafter opened upon relay deenergization.

6. The system claimed in claim 4 wherein said first time delay relay includes first normally-open contacts series-connected with said solenoid, said first time delay relay closing said first contacts upon relay energization and thereafter opening said first contacts at a time following relay deenergization equal to said second predetermined time period and wherein said second time delay relay includes second normally-open contacts series-connected with said clutch, said second time delay relay closing said second contacts at a time following relay energization equal to said first predetermined time period and thereafter opening said second contacts upon relay deenergization.

7. The system claimed in claim 6 further including first and second oppositely-poled switches jointly manually operable, said first switch being connected in parallel with said first time delay relay contacts and said second switch being series-connected with said second time delay relay contacts, whereby said solenoid may be energized therethrough on closure of said first switch with said clutch being then rendered unenergizable by accompanying opening of said second switch.

8. The system claimed in claim 1 wherein said first conveyor means comprises belt means having a conveying surface defining projections for engaging rods to forceably issue said rods from said rod receiver means and wherein said second conveyor means of said rod hopper means comprises belt means defining a flat conveying surface.

9. The system claimed in claim 1 wherein said first conveyor means comprises a pair of endless belts spaced from one another transversely of the direction of conveyor travel and wherein said second conveyor means comprises a pair of endless belts transversely spaced in the direction of conveyor travel to an extent less than said first conveyor means belts.

10. The system claimed in claim 9 wherein said belt means of said first and second conveyor means are inclined relative to one another in the directions of travel thereof.

11. The system claimed in claim 1 wherein said rod hopper means includes upstanding forward and rear walls spaced from one another along an axis perpendicular to said walls and rod level sensor means comprising a radiant energy source and a radiant energy detector disposed in axial alignment with one another on an axis other than such perpendicular axis.

12. The system claimed in claim 11 wherein said rod level sensor means includes circuit means connected to said detector for suppressing generation of said first output signal upon light communication between said radiant energy source and said detector of time extent less than a prescribed period.

13. A system for transporting cigarette rods from a first rod supply location to a second cigarette maker location, comprising:
   a. conduit means extending from said first location to said second location;
   b. pneumatic source means having an outlet and energizable to supply pressurized air to said outlet;
   c. rod supply means at said first location defining a passage between said pneumatic source means outlet and said conduit means and energizable to supply individual rods to said passage;
   d. rod receiver means at said second location for receiving rods conveyed through said conduit and having an outlet, said rod receiver means including first conveyor means issuing rods sequentially therefrom at said outlet;
   e. rod hopper means at said second location comprising first and second separable vertically-stacked hoppers, said first hopper having a sideward inlet for receiving rods issuing sequentially from said rod receiver means outlet, second conveyor means for conveying rods from said sideward inlet to the interior of said first hopper and a downward outlet for transferring said rods to cigarette making machinery, said rod hopper means generating a first output signal upon containment of rods in said first and second hoppers in quantity less than a preselected rod quantity and generating a second output signal upon containment of rods in said first and second hoppers in quantity equal to said preselected rod quantity;
   f. control means responsive to said rod hopper means first output signal to energize said pneumatic source means and to energize said rod supply means upon expiration of a first predetermined time period after such energization of said pneumatic source means and responsive to said second output signal to deenergize said rod supply means and to deenergize said pneumatic source means upon expiration of a second predetermined time period after such deenergization of said rod supply means.

14. The system claimed in claim 13 wherein said rod hopper means further includes arm means disposed atop rods issuing from said second conveyor means and pivotally movable by such hopper-contained rods from said first hopper into said second hopper and exerting force on rods contained therebelow throughout such movement of magnitude enhancing delivery of said contained rods to said downward outlet.

15. The system claimed in claim 14 wherein said second conveyor means defines a conveying surface inclined vertically upwardly from said first hopper inlet to such first hopper interior.

16. The system claimed in claim 15 wherein said second conveyor means comprises a pair of endless belts spaced transversely in the direction of conveyor travel.

17. The system claimed in claim 16 wherein said endless belts define flat conveying surfaces.

18. The system claimed in claim 13 wherein said second hopper includes forward and rear walls spaced along an axis perpendicular to said walls, said rod hopper means further including rod level sensor means comprising a radiant energy source and a radiant energy detector disposed in axial alignment with one another on an axis other than such perpendicular axis.

* * * * *